(12) United States Patent
Canuto et al.

(10) Patent No.: US 8,831,851 B2
(45) Date of Patent: Sep. 9, 2014

(54) VEHICLE WITH BRAKE STEERING

(75) Inventors: Francesco Canuto, Turin (IT); Riccardo Morselli, San Vito di Spilamberto (IT); Claudio Fonti, Ancona (IT)

(73) Assignee: CNH Industrial America LLC, New Holland, PA (US)

( * ) Notice: Subject to any disclaimer, the term of this patent is extended or adjusted under 35 U.S.C. 154(b) by 79 days.

(21) Appl. No.: 13/394,512

(22) PCT Filed: Sep. 9, 2010

(86) PCT No.: PCT/EP2010/063220
§ 371 (c)(1),
(2), (4) Date: Jun. 15, 2012

(87) PCT Pub. No.: WO2011/029864
PCT Pub. Date: Mar. 17, 2011

(65) Prior Publication Data
US 2012/0253625 A1  Oct. 4, 2012

(30) Foreign Application Priority Data

Sep. 11, 2009 (IT) .................. TO09A0699

(51) Int. Cl.
- *B60T 8/24* (2006.01)
- *G06F 7/00* (2006.01)
- *G06F 17/00* (2006.01)
- *G06G 1/00* (2006.01)

(52) U.S. Cl.
USPC .................. 701/72; 701/70; 701/41; 701/23

(58) Field of Classification Search
CPC .......... G06F 7/00; G06F 17/00; G06F 19/00; G06F 11/14; B60G 17/018; B60G 17/019; B60G 17/016

USPC .................. 303/140, 412; 180/412, 197, 22; 701/41, 48, 80, 70, 72

See application file for complete search history.

(56) References Cited

U.S. PATENT DOCUMENTS

| | | | |
|---|---|---|---|
| 6,438,474 B1 * | 8/2002 | Tanaka et al. | 701/41 |
| 7,516,003 B2 * | 4/2009 | Maeda et al. | 701/41 |
| 7,698,034 B2 * | 4/2010 | Ghoneim | 701/41 |
| 2003/0074127 A1 * | 4/2003 | Kin et al. | 701/80 |
| 2004/0080209 A1 * | 4/2004 | Leimbach et al. | 303/146 |
| 2005/0004732 A1 * | 1/2005 | Berry et al. | 701/48 |
| 2005/0217906 A1 * | 10/2005 | Spark | 180/22 |
| 2007/0233351 A1 * | 10/2007 | Wang | 701/70 |
| 2007/0288142 A1 * | 12/2007 | Maeda et al. | 701/41 |
| 2009/0095562 A1 * | 4/2009 | Yasui et al. | 180/412 |
| 2009/0101428 A1 * | 4/2009 | Itoh | 180/197 |
| 2009/0184572 A1 * | 7/2009 | Yamada et al. | 303/140 |
| 2011/0022268 A1 * | 1/2011 | Kojo | 701/41 |

* cited by examiner

*Primary Examiner* — Calvin Cheung
*Assistant Examiner* — Luis A Martinez Borrero
(74) *Attorney, Agent, or Firm* — Sue C. Watson

(57) ABSTRACT

A vehicle including a respective brake for each driven, ground-engaging member that is operable under the control of driven member brake commands generated in a controller, a ground-engaging, steerable member that defines a steering angle, a sensor for generating a steering angle signal that is indicative of the steering angle, a sensor for generating a vehicle speed signal, and a sensor for generating a respective driven member speed signal. The controller is capable of generating driven member brake commands based on steering angle and vehicle speed signals together with a driven member slip estimation signal that is generated from the driven member speed signals.

20 Claims, 8 Drawing Sheets

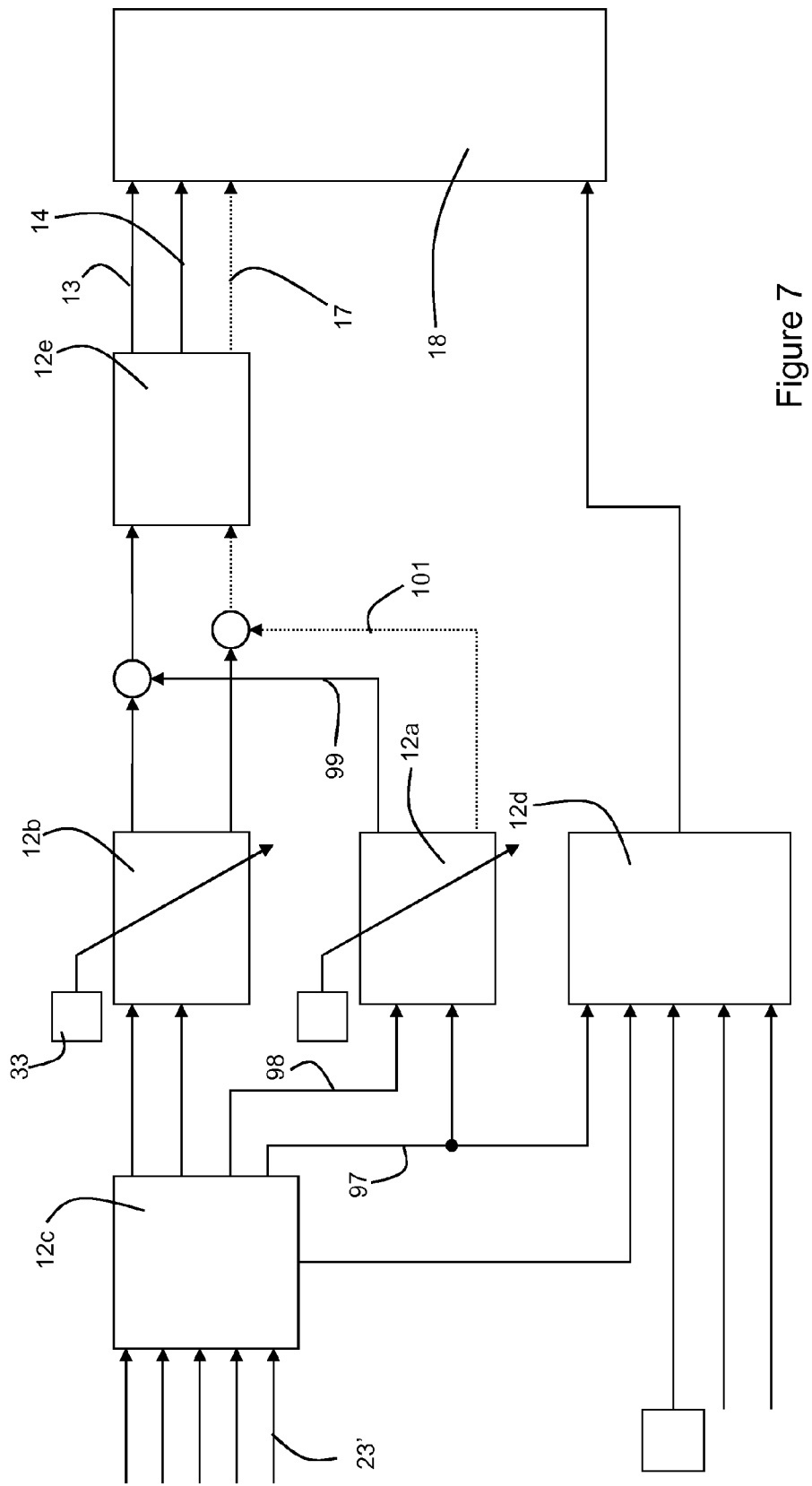

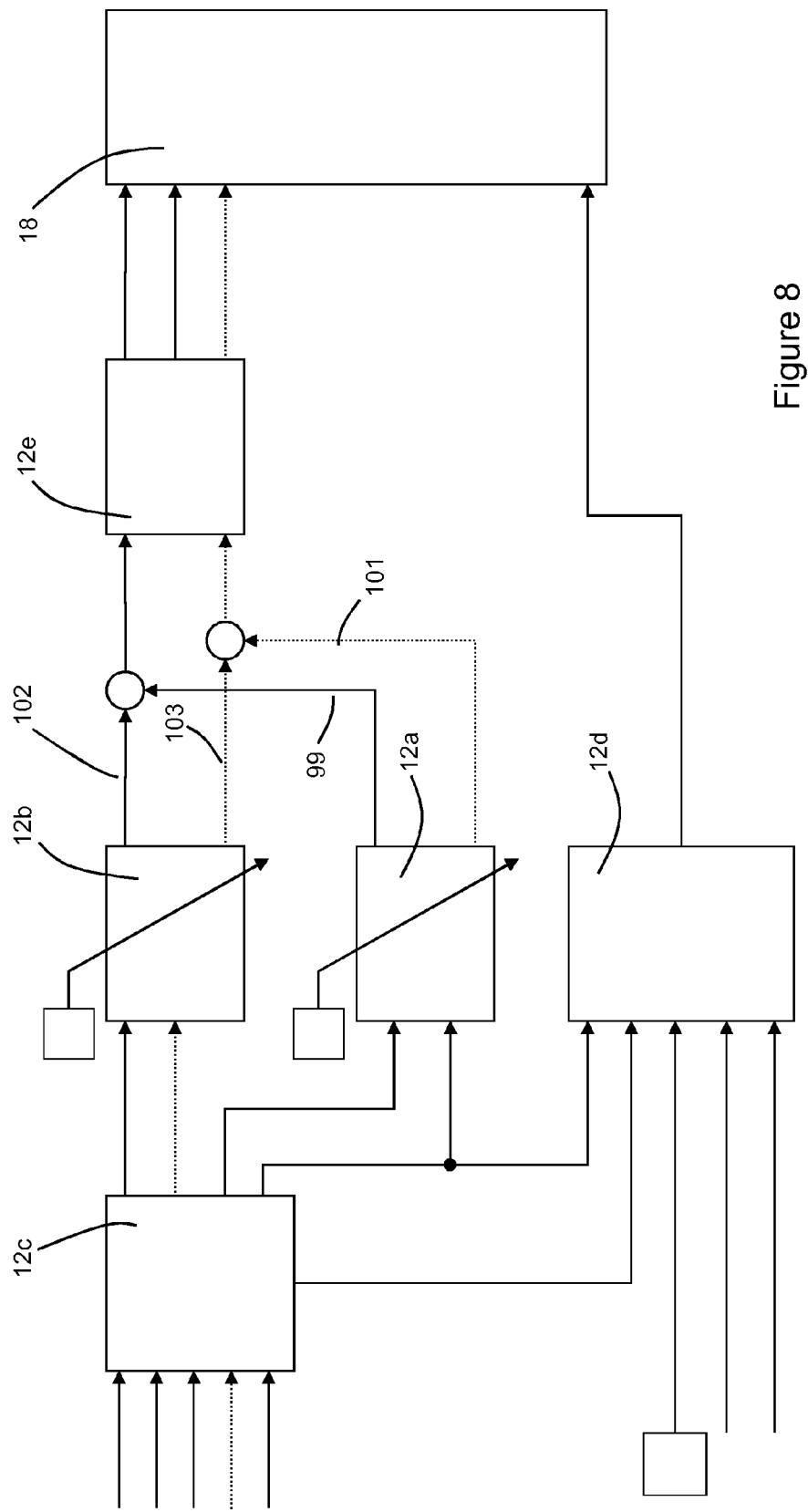

VEHICLE WITH BRAKE STEERING

CROSS REFERENCE TO RELATED APPLICATIONS

This application is the US National Stage filing of International Application Serial No. PCT/EP/2010/063220 filed on Sep. 9, 2010, which claims priority to Italian Application Serial No. TO2009A000699 filed Sep. 11, 2009, each of which is incorporated herein by reference in its entirety for all purposes.

TECHNICAL FIELD

This invention relates to a vehicle and in particular, but not exclusively, to land vehicles intended for use "off road" for example in agriculture and in construction industries.

BACKGROUND

Such vehicles tend to be large and heavy. Although they are designed for use in off-road situations they are frequently required to move on roads for example when travelling between working locations.

An example of a vehicle to which the invention relates is an agricultural tractor. As is well known this is a relatively heavy, multi-use vehicle that is employed for a variety of tasks such as ploughing, harrowing, seeding, dosing, towing and, when equipped with a (typically front-mounted) shovel or tines, loading.

When carrying out the majority of these tasks the tractor operates in a field. In nearly all cases the operation of the tractor involves repeated passes from one end of the field to the other, until the task in question is complete over the whole field area.

During such working it is necessary for the tractor to turn through approximately 180 degrees at the end of each pass in order to prepare for the next pass.

Productive fields include so-called headlands, at each end, one purpose of which is to provide a space in which the tractor (and other agricultural vehicles) may turn.

When turning a tractor cannot complete any of the aforementioned activities. This is because it is necessary to lift any ground-engaging implement, such as a plough, in order to permit the tractor to turn without any risk of damage to the implement or tractor. Even when the implement carried by the tractor is not ground-engaging (for example when it is a seed coulter or a spray boom for dosing the field with chemicals) it is deactivated during headland turning manoeuvres in order to avoid wastage of seeds or agrochemicals.

The headlands usually are not sown with crop plants and instead contain grass or other non-crop plants. The driver of the tractor may turn in such areas without concern as to the inability of the tractor to complete any working activities. This is because no disadvantage in terms of failure properly to cultivate crop arises in respect of headland areas that are not intended to be sown or harvested.

In order for the tractor to complete its work in a field efficiently it is desirable for any headland turn to exhibit as small a turn radius as possible. Indeed ideally the turn radius should be little greater than the width of the tractor (or at least any implement supported by it) so that there is no need for a trajectory correction after the tractor has commenced the next pass along the field. Minimising of the turn radius also helps to keep the dimensions of the (non-productive) headlands as small as possible.

As is also well known, a tractor typically includes two relatively large-diameter, rear, driven wheels located respectively on opposite sides of the vehicle cab; together with two typically but not necessarily smaller diameter, steerable front wheels that also are located on respective sides of the vehicle, adjacent the front end of the engine hood.

It has for long been known to provide for independent braking of at least the rear, driven wheels so that a tractor operator may control the braking of each such wheel independently of the other. This facility in turn permits the performance of extremely tight-radius headland turns, through a technique of braking the rear wheel on only one side of the tractor (i.e. the side towards which the tractor is required to turn) while simultaneously applying a sharp steering angle in the same steering direction via the steerable front wheels.

When braking one of the rear wheels in this fashion the aim of the tractor operator is to lock the wheel in question. Since the rear wheels are connected via a differential this action causes the rotational speed of the un-braked rear wheel to increase significantly. This in turn causes the tractor to slew about an axis coinciding approximately with a location on its rear axle and thereby execute the desired, tight-radius turn.

In order to permit use of the tractor in this fashion older tractor designs include separate brake pedals respectively for the left and right rear wheels. An hydraulic braking system including a tandem master cylinder applies oil pressure to the wheel brake the pedal of which is depressed during a headland turn, and leaves the un-braked wheel free to be driven in dependence on the tractor engine torque transmitted via the differential.

A skilled tractor operator can execute very tight turns when proceeding in the manner outlined. Despite this, there are numerous disadvantages to a non-automated braking system of the kind outlined.

The first of these is that the turning manoeuvre when executed as described above causes damage to the headland. This is in turn associated with several problems, as follow:
  a damaged headland includes undulations that make it difficult for vehicles subsequently to use the headland efficiently and that may adversely affect field drainage;
  the headland itself may (for example when the field in question is being cultivated for the purpose of producing forage, or for grazing) be sown with valuable crop that should not be damaged; and
  the headland may include a legal right of way (e.g. a footpath or bridleway) that the farmer is obliged to maintain in good condition.

Secondly even a skilled operator may not execute the headland turns consistently. This has an effect on the efficiency of operation of the tractor.

Thirdly, depending on the dimensions of the headland, it may not be possible to make a turn as a single manoeuvre. It may on the contrary be necessary to select a reverse transmission ratio in order to make part of the turn.

Potentially of greater concern is the fact that an ability to brake the rear wheels independently may contribute to accidents when the tractor is used on a road. Statistical data suggest that accidental operation of independent rear brakes is a significant factor in many tractor accidents on roads since such situations usually involve the tractor in slewing off the road at speed. This is likely to become a more significant problem as the on-road speeds of tractors are increased to 50 km/h or more, in line with current development trends. A tractor that veers across a road at such a speed may be uncontrollable, may tip over and even if it remains upright may cause severe damage to other vehicles, to roadside installations and to buildings. There is also an attendant risk of human or animal injury in such situations.

It is known to provide in a tractor a swivelling front axle that supports the front wheels and the per se known components of an Ackerman steering assembly. The axle may be caused to pivot under the control of a pneumatic actuator under certain conditions so as to permit the steerable wheels to adopt a more acute steering angle than would otherwise be possible.

An example of a swivelling front axle of this kind is available for example in the New Holland TN-A range of tractors and is known by the trade mark "Super Steer". This kind of axle permits a tractor to make extremely tight headland turns while minimising damage to headlands, but it is not suitable for use in all kinds of tractor.

Reasons for this include the fact that a swivelling front axle is a relatively expensive addition to a tractor. This is because it requires a re-design of the front part of the tractor frame and the axle, together with the installation of one or more actuators and a control system.

Furthermore the ability to adopt an extremely acute steering angle may in the absence of design measures intended to obviate the problem cause the front wheels of the tractor potentially to foul against the body of the tractor in the vicinity of the engine hood.

This of course is completely undesirable. In the case of a swivelling front axle therefore it may be necessary to re-design the front part of the hood, with concomitant impact on vehicle development and production costs. The re-design of the hood may also cause a reduction in the area available for cooling air intakes. This in turn may have an adverse impact on the efficiency of the tractor engine, unless further design modifications are made.

It follows that while a swivelling front axle is a successful solution to the problem of improving the sharpness of tractor turns it may only be economically viable in large or high-value tractors. In mid-range and economy tractor models it may not be possible to recover the extra costs of designing and installing a swivelling front axle within the purchase prices of the vehicles.

In recent years the extent of automation of the sub-systems of agricultural vehicles such as tractors has increased. Nowadays a tractor may include one or more of the following electronic or electromechanical sub-systems:

an engine management controller that optimises the fuelling of the vehicle for a given torque load and transmission ratio setting and/or provides indications to the operator aimed at improving efficiency or workrate;

an electronic transmission control system;

anti-lock brakes ("ABS") including electronically controlled brake actuators;

an "electronic stability program" ("ESP") that controls the suspension and damping of the vehicle in an optimised manner so as to prevent operator discomfort or tilting of the vehicle;

typically in conjunction with an ESP, electromechanical, electrohydraulic or electropneumatic suspension and ride height adjustment actuators;

a global positioning system ("GPS");

optical image-displaying devices such as electronic camera and monitor combinations for enhancing the operator's view of the area surrounding the tractor;

electronic control of the settings (e.g. the operating height) of an implement supported on the tractor;

data transmission and telemetry apparatuses;

inclinometers that generate signals indicating whether the tractor is operating on a slope;

apparatuses such as dust filters and air conditioning components designed to improve the environment of the operator's cab; and operator comfort/convenience sub-systems such as rain-sensing windshield wipers, automatically dimming mirrors, windshield demisters, audio systems and seat heaters.

The foregoing list of electronic sub-systems is not exhaustive and a tractor or other agricultural vehicle may include further electronic and electromechanical components if desired. The precise mix of sub-systems included in a tractor is dictated primarily by the price the purchaser is prepared to pay for the vehicle.

Proposals exist to provide in a tractor having electronically controlled brake actuators that operate on the rear wheels a control arrangement permitting selective locking of one rear wheel, during a headland turn, under electronic control.

In a typical installation of this kind the tractor includes a sensor that senses the steering angle as determined by the extent of operator-initiated rotation of the steering wheel, and generates an indicative control signal. If this angle exceeds a certain value (thereby signifying that the tractor operator is attempting a sharp, headland turn) and the vehicle speed is low enough that a sharp turn may be safely executed an electronic controller may then generate control commands that cause actuation of the brake on one side of the tractor corresponding to the direction of the turn. This causes locking of the rear wheel on the aforesaid side, so as to cause a sharp turn without any need for operator skill in terms of the amount of brake pressure required on the "turn" side of the vehicle.

Such a method of steering a vehicle is referred to herein as "braking steering". The term "brake-steer" should in addition be construed in accordance with the foregoing description.

An arrangement as outlined may include a control law that prevents differential braking from occurring when the vehicle speed exceeds a threshold value.

Examples of such steering systems are described in published patents/patent applications nos. US2007267916, U.S. Pat. No. 6,588,858, DE4224887, EP0295396, DE3701958, GB2188012, JP2000198462, JP2000185666 and JP11310122.

DE 3612010 discloses a brake-steering arrangement in which a control valve in a hydraulic brake system is switchable between a centre position in which it provides a braking force equally to each of the rear wheels of a tractor and a biased position in which it provides for asymmetric braking forces.

U.S. Pat. No. 3,429,392 discloses an arrangement in which mechanical linkages forming part of a steering mechanism cause automatic actuation of the brakes on one or other side of a vehicle when the steering wheel is turned so as to cause the linkages to engage the rod of an actuator. The actuator causes biased operation of the hydraulic brakes of the vehicle.

U.S. Pat. No. 6,216,806 describes an arrangement in which the pressure of hydraulic fluid in the steering system of a vehicle may be augmented by braking system hydraulic pressure in the event of the steering pressure decreasing below a threshold value. A two-position valve controls the extent to which braking system pressure is admitted to the steering system in dependence on prevailing pressures.

In US2007051554 there is disclosed a differential braking arrangement for a load-carrying vehicle that seeks to replicate in the loaded condition of a load bed some aspects of the handling of the vehicle when it is empty of goods. The arrangement of US2007051554 employs biased braking control signals to cause asymmetric braking of the vehicle so that the degree of understeer encountered when the bed is loaded is reduce to a level that is similar to that exhibited when the bed is empty.

There is a need for a vehicle including a braking system that overcomes or ameliorates one or more problems extant in the prior art.

SUMMARY

According to the invention in a broad aspect there is provided a vehicle including a frame, body or chassis defining left and right sides and comprising at least one source of motive power; at least one respective, driven, ground-engaging member supported on each said side of the vehicle so as to be moveable relative to the vehicle during motion of the vehicle; at least one driven member drive train for connecting the or each said source so as to cause movement of at least one of the driven, ground-engaging members and hence of the vehicle; a respective brake, for each driven, ground-engaging member, that is operable under the control of driven member brake commands generated in a controller so as to provide a respective braking effort for each of the driven, ground-engaging members; at least one ground-engaging, steerable member that defines a steering angle, relative to the vehicle, that is adjustable on the operation of one or more control members; at least one sensor for generating a steering angle signal that is indicative of the steering angle; at least one sensor for generating a vehicle speed signal that is indicative of the vehicle speed relative to the ground; and at least one sensor for generating a respective driven member speed signal that is indicative of the movement speed relative to the vehicle of each driven, ground-engaging member, characterised in that the controller is capable of generating the driven member brake commands based on the steering angle and vehicle speed signals together with a driven member slip estimation signal that is generated from the driven member speed signals.

An advantage of this arrangement is that through using an estimation of the slip of the driven members as a control input it is possible to achieve braked steering of the kind indicated herein without locking of a braked, driven member occurring. Such a benefit may arise from control of the braking effort in each driven member such that only a chosen, limited degree of slip occurs.

This in turn means that headland damage when turning a tractor in this fashion may be eliminated.

Furthermore a vehicle in accordance with the invention may be arranged so that the only operator-induced variables during turning are the vehicle speed as determined by a combination of the transmission ratio selected and the throttle/engine governor setting; and the steering angle as determined by the extent to which the steering wheel (or other steering control member) of the vehicle is turned. It follows that the braking aspects of the steering operation may be made completely automatic. This further means that if desired the dual braking pedals of prior art tractors may be eliminated, since the operator of the vehicle would be required to press a brake pedal (or operate an alternative braking control member) when requiring to brake the vehicle using equal braking forces applied on the respective sides.

As a result of the foregoing a vehicle in accordance with the invention when configured as a tractor or another large agricultural vehicle may be made considerably safer than a prior art tractor, etc., since the risk of incorrect braking steering occurring e.g. in on-road situations does not arise.

A vehicle according to the invention is highly suitable as a high-speed tractor, because of its enhanced braking safety.

Preferably the controller is programmable and generates the driven member brake commands so as to brake the driven members in order to permit no more than a chosen, maximum degree of slip of the driven members or to cause the slip value to track a time-varying reference slip value.

It is also preferable that the chosen maximum degree of slip of the driven members is adjustable. Such adjustment may be conveniently effected through use of a control element, such as a potentiometer dial, that is operatively connected to the programmable controller. To this end therefore the vehicle optionally includes a slip adjustment member that is operatively connected to the controller so as to permit adjustment of the chosen maximum degree of slip.

Additionally or alternatively, in preferred embodiments of the invention, the extent to which the controller generates driven member brake commands based on the steering angle is adjustable.

Conveniently therefore the vehicle preferably includes a steering angle gain adjustment member that is operatively connected to the controller so as to permit adjustment of the extent to which the controller generates driven member brake commands based on the steering angle.

Preferably the vehicle includes operatively connected to the controller an automatic braking mode selection switch by means of which a driver of the vehicle may selectively activate and deactivate the controller so as to generate the said driven member brake commands.

Optionally the vehicle may include a programmable controller the programming of which is such as to over-ride the automatic braking mode selection switch in the event of the vehicle speed exceeding a predetermined threshold value. Therefore in a preferred embodiment of the invention the controller prevents generation of the said driven member brake commands, regardless of the state of the selection switch, if the vehicle speed signal exceeds a predetermined value.

Since the primary application of the technology of the invention is in a large agricultural vehicle such as (but not limited to) a tractor, multipurpose vehicle (such as a forward-cab vehicle) or loader, preferably each driven, ground-engaging member is a driven wheel. However the principles of the invention may equally well be employed in other vehicle types in which the primary, ground-engaging members are e.g. endless tracks.

In preferred embodiments of the invention the vehicle preferably includes a pair of ground-engaging, steerable members in the form of a respective, steerable wheel located on each of the left and right sides of the vehicle. Such an arrangement is consistent with the architecture of conventional tractors, loaders and multipurpose farm vehicles.

When so configured the vehicle of the invention preferably includes a respective brake, for each steerable wheel, that is operable under the control of steerable wheel brake commands generated in a controller so as to provide a respective braking effort for each of the steerable wheels. Generally in practical situations the braking of the steerable wheels would not be applied in a differential fashion as in the case of the driven, ground-engaging members since steerable wheels are not normally used in brake-steer operations. However the arrangement of the invention allows the possibility of applying differing braking forces at the respective steerable (typically front) wheels of the vehicle.

In such situations preferably the controller is capable of generating the steerable member brake commands based on the steering angle and vehicle speed signals together with a wheel slip estimation signal that is generated from the driven member speed signals.

In one preferred embodiment of the vehicle of the invention each brake is an hydraulic brake, and the vehicle includes a driver-operated brake member and operatively connected thereto an electrohydraulic converter that is operatively connected to the or each said controller and is connectable to a source of pressurised hydraulic fluid, the electrohydraulic converter converting operation of the driver-operated brake member into hydraulic pressure acting evenly in each said brake so as to generate identical braking efforts in brakes on opposite sides of the vehicle.

In consequence the vehicle may be braked in a conventional manner, through the use of an actuator member such as a brake pedal, in order to achieve equal braking forces in each brake. However the electrohydraulic converter on receiving driven member brake commands from the controller is in a preferred embodiment of the invention capable of causing a respective hydraulic pressure to act in the each said brake in dependence on the steering angle, vehicle speed and slip estimation signals.

In other words, in accordance with the invention the braking system of the vehicle is of a "dual mode" type that is operable either conventionally or in accordance with differential brake force principles, as described herein, in order to achieve a braking-steering effect.

In another embodiment of the invention each brake is a pneumatic brake or a pneumatic-hydraulic brake, the vehicle including a driver-operated brake member that is connectable to a source of pneumatic fluid under pressure and that on operation causes pneumatic pressure to act evenly in each said brake so as to generate identical braking efforts in brakes on opposite sides of the vehicle.

By "pneumatic-hydraulic" brake is meant a brake that includes a converter of pneumatic fluid pressure to hydraulic in a brake assembly, such that the braking force is predominantly generated in a pneumatic circuit.

By convention pneumatic power circuits are more commonly employed than hydraulic circuits for the braking of large vehicles such as tractors. The principles of the invention as described herein are equally applicable to pneumatically and hydraulically operated braking circuits. The choice of whether to use one of these types or the other therefore may be determined for example by the unladen mass of the vehicle under consideration.

When so configured the vehicle of the invention preferably includes at least one pneumatic fluid distribution valve that is operatively connectable to the or each said controller and is connectable to a source of pneumatic fluid under pressure so as to distribute the fluid to cause a respective hydraulic pressure to act in the each said brake in dependence on the steering angle, vehicle speed and slip estimation signals.

Such an arrangement is simple to embody and is reliable in use.

As an alternative to the foregoing possibilities it is possible to embody the vehicle of the invention including electromechanical brakes. Devising or selecting the precise control components needed to implement such an arrangement would be within the ordinary knowledge of the worker of skill in the art.

Regardless of the precise source of power used in the brakes of the vehicle of the invention preferably the controller includes an observer module that receives at least the steering angle signal, the vehicle speed signal and the driven member speed signals and generates therefrom slip signals for the respective driven, ground engaging members. The observer module conveniently is part of or includes a microprocessor, although other types of control device (such as but not limited to a pneumatic or hydraulic logic circuit) may be employed if desired.

When the vehicle of the invention is embodied as a tractor or another wheeled vehicle preferably the controller generates the driven member slip signals based on the equation $$S = \frac{\omega \cdot R - V_s \times 100}{V_s} \quad (1)$$

wherein:
S is the slip estimation
$\omega$ is the driven member speed signal value obtained from a said driven member
R is the radius of the driven member and
$V_s$ is the value of the vehicle speed signal.

An objective of the invention is to maintain slip of the driven members (e.g. rear tractor wheels) at less than a threshold value, or to follow a desired, time-varying reference value. Such a value may be predetermined for all driving conditions of the vehicle or more preferably may be adjustable at the option of the operator of the vehicle, this being the reason for inclusion of the slip adjustment member disclosed herein. Through use of such a member the vehicle operator may adjust the degree of slip by altering the gain terms in an algorithm based on Equation 1.

The output of Equation 1 may be expressed as a percentage or ratio that may in turn form the basis of an adjustment scale marked adjacent the slip adjustment member or displayed during use of the vehicle via a display device inside the cab of the vehicle. The vehicle operator may set the adjustment member to correspond to a particular degree of slip (chosen to suit e.g. the payload of the vehicle, the ground conditions and the task being undertaken) so as to provide for tight headland turns without causing noticeable damage to the ground.

The majority of agricultural tractors are two-wheel drive vehicles in which only the relatively large-diameter, rear wheels constitute driven, ground engaging members. There exist however several designs of tractor that are four-wheel drive vehicles. Typically in such designs the front, steerable, driven wheels also are smaller than the rear wheels.

Also in agriculture and construction are known multipurpose farm vehicles, so-called "forward cab" utility vehicles and loaders the basic layouts of which differ in some respects from those of conventional tractors. Such vehicles typically are four-wheel drive vehicles.

The invention embraces within its scope all such variants and to this end may include including a steerable member drive train for connecting at least one said source so as to cause movement of each of the steerable wheels relative to the vehicle.

When so arranged the vehicle of the invention optionally may include a drive decoupler for selectively disconnecting the steerable member drive train in dependence on the value of the steering angle signal. Such a feature advantageously allows braking steering through slip-controlled braking of the non-steerable wheels of the vehicle while permitting the vehicle at other times to perform as a four-wheel drive vehicle.

In a further refinement the vehicle of the invention may advantageously include one or more antilock brake system (ABS) modules operative on at least one said brake.

Aside from the known safety advantages that an ABS braking module provides during normal use of a vehicle, the inclusion of antilock brakes in the vehicle of the invention is associated with further, unexpected benefits.

The first of these is that the antilock braking action, that typically involves repeatedly applying and releasing the vehicle's brake pads at a relatively high frequency so that the vehicle wheel is during braking operating at close to a locked condition, may be employed for the purpose of controlling slip in the manner described herein.

The use of antilock brakes is not essential for this purpose but antilock control of the brakes of the vehicle can provide for more accurate control of slip than would otherwise be the case.

Furthermore an antilock brake assembly includes a wheel speed sensor. The inclusion of antilock brakes therefore advantageously provides one of the components that is desirable in a vehicle according to the invention.

Preferably the vehicle of the invention includes an inclinometer that is capable of generating signals indicative of at least the fore and aft (pitching) inclination of the vehicle. The controller preferably is programmable and is so arranged that when the inclinometer, steering angle and vehicle speed signal values are not zero and the brake actuator is operated to apply the brakes they are applied uniformly on the left and right sides of the vehicle, subject to the condition that the inclinometer signal value must exceed a predetermined threshold for this effect to arise.

The inclinometer when present in the vehicle thus may be employed as an additional check on whether the ground conditions safely permit a sharp turn of the kind described above. In other words, the brake-steer effect may be inhibited for example if a slope on which the vehicle operates is too steep to permit safe brake-steer turning.

The invention is also considered to reside in a method of controlling a vehicle including a frame, body or chassis defining left and right sides and comprising at least one source of motive power; at least one respective, driven, ground-engaging member supported on each said side of the vehicle so as to be moveable relative to the vehicle during motion of the vehicle; at least one driven member drive train for connecting the or each said source so as to cause movement of at least one of the driven, ground-engaging members and hence of the vehicle; at least one ground-engaging, steerable member that defines a steering angle, relative to the vehicle, that is adjustable on the operation of one or more control members; at least one sensor for generating a steering angle signal that is indicative of the steering angle; at least one sensor for generating a vehicle speed signal that is indicative of the vehicle speed relative to the ground; at least one sensor for generating a respective driven member speed signal that is indicative of the movement speed relative to the vehicle of each driven, ground-engaging member; and a respective brake, for each driven, ground-engaging member, the method including the steps of generating driven member brake commands in a controller for controlling the brakes so as to provide a respective braking effort for each of the driven, ground-engaging members; and generating from the driven member speed signals a driven member slip estimation signal, the driven member brake commands being based on the steering angle and vehicle speed signals together with the driven member slip estimation signal.

Optionally the controller is programmable and the method includes generating the driven member brake commands so as to brake the driven members in order to permit no more than a chosen, maximum degree of slip of the driven members or to cause the slip value to track a time-varying reference slip value.

It is further optional that the chosen maximum degree of slip of the driven members is adjustable and/or the extent to which the controller generates driven member brake commands based on the steering angle is adjustable.

In one version of the method the controller prevents generation of the said driven member brake commands, regardless of the state of the selection switch, if the vehicle speed signal exceeds a predetermined value.

The method optionally includes the step of generating in the controller the steerable member brake commands based on the steering angle and vehicle speed signals together with a wheel slip estimation signal that is generated from the driven member speed signals.

In accordance with the method the controller generates the driven member slip signals based on the equation $$S = \frac{\omega \cdot R - V_s \times 100}{V_s}$$

wherein:
S is the slip estimation
$\omega$ is the driven member speed signal value obtained from a said driven member
R is the radius of the driven member configured as a driven wheel and
$V_s$ is the value of the vehicle speed signal.

BRIEF DESCRIPTION OF DRAWINGS

There now follows a description of preferred embodiments of the invention, by way of non-limiting example, with reference being made to the accompanying drawings in which:

FIG. 7 shows the statuses of the FIG. 6 control elements during braking of the vehicle without initiation of a brake-steer effect; and FIG. 8 shows the FIG. 6 shows the statuses of the FIG. 6 control elements during brake-steering.

DETAILED DESCRIPTION

Figure 1:
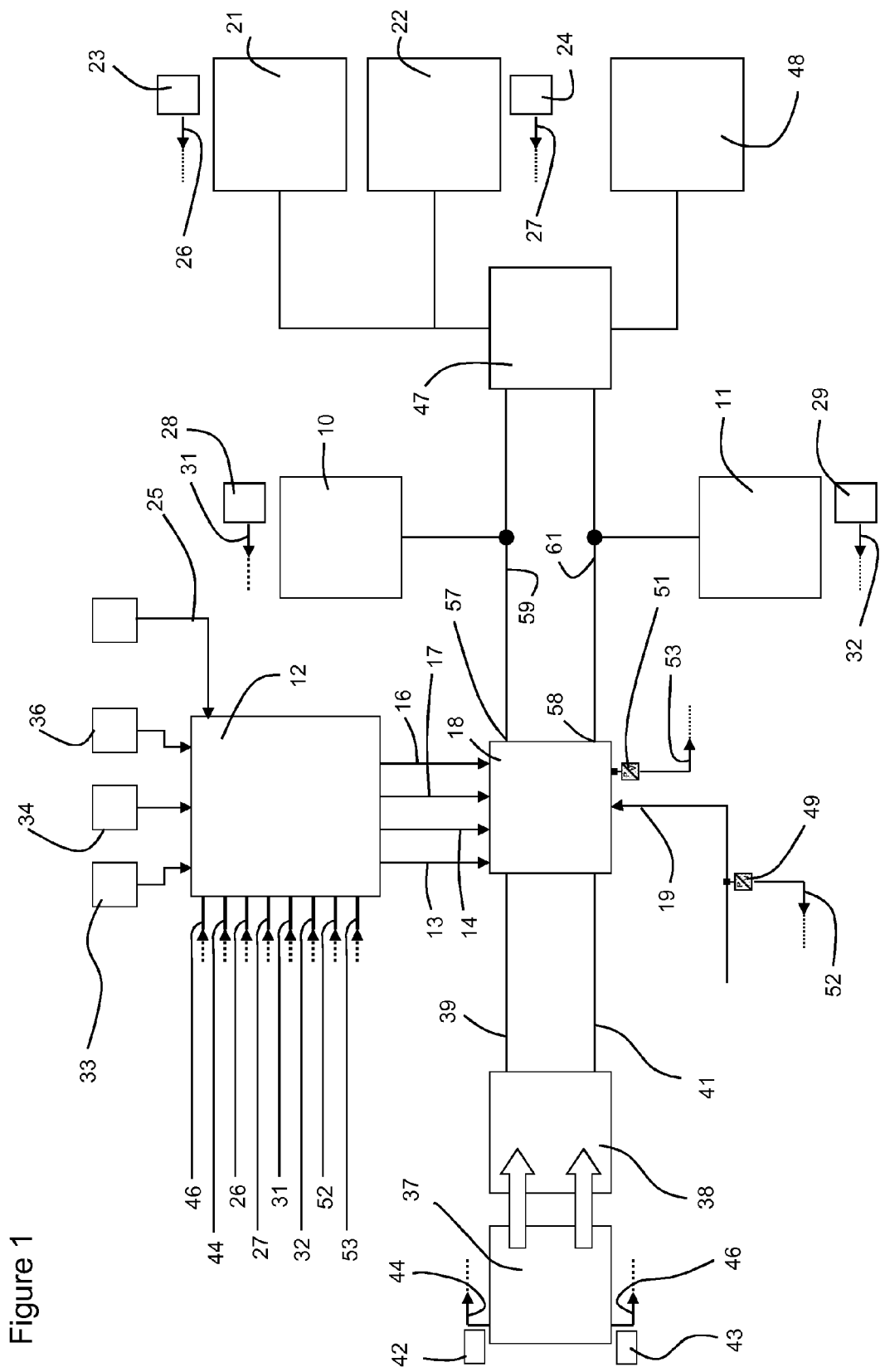
FIG. 1 shows in schematic, block diagram form certain components of a vehicle, in accordance with the invention, that includes a hydraulic braking circuit.

Referring to FIG. 1 there is shown in schematic form some components constituting a vehicle that is in accordance with the invention. Such a vehicle may in the preferred embodiment be constructed as an agricultural tractor or, in other embodiments, a multipurpose vehicle, a loader or any of a range of other vehicle types (including "forward cab" vehicles other than multipurpose vehicles).

Such a vehicle includes a frame, body and/or chassis defining left and right sides of the vehicle. The precise constructional technique (whether of the separate chassis, open frame, monococque or other types) employed in the vehicle is essentially immaterial to the operation of the components described herein.

The frame (if present), body and chassis (if present) parts of the vehicle may be of designs that are known to the worker of skill in the art. In general the precise arrangements of these parts of the vehicle are not important to the principles by which it operates.

When configured as a tractor, multipurpose vehicle, loader or similar machine the vehicle of the invention includes at least four ground-engaging wheels of which at least two (and in many examples, four) are driven to rotate, relative to the vehicle, during forward or rearward motion of the latter. To this end the vehicle therefore includes a power source that typically but not necessarily is a diesel engine couple via a driven member drive train to drive the driven wheels. The drive train may include one or more of a transmission, drive shaft, differential, viscous coupling or other driver-transferring coupling, and/or a transfer box. Obviously the precise arrangement of the driven member drive train will vary from vehicle to vehicle within the scope of the invention, depending on the precise vehicle design adopted.

When so configured the vehicle would additionally include left and right steerable front wheels that preferably are supported as part of a per se known Ackermann steering assembly.

The vehicle of the invention may alternatively be configured so as to have on each side only two ground-engaging members that in such a situation may be moveable, endless, driven tracks that pass around drive and jockey wheels for the purpose of permitting powered movement of the tracks relative to the vehicle in a manner that causes movement of the vehicle. The remainder of this description however relates to a vehicle having four ground-engaging wheels, and especially two driven rear wheels and two steerable front wheels that may also be driven.

Furthermore the description hereinafter assumes that the steering angle of the steerable front wheels may be selected through use of a rotary steering wheel by the vehicle operator (although other means of selecting a steering angle, such as but not limited to one or more steering levers, sliders or for example touch-screen icons as would occur to the worker of skill, are within the scope of the invention).

As illustrated schematically in FIG. 1, that for clarity omits the parts of the vehicle described in the immediately preceding paragraphs, each of the left and right rear wheels of the vehicle includes a respective brake 10, 11.

Each rear brake 10, 11 preferably is of an essentially conventional design in which one or more brake pads may be caused to engage a brake disc under the influence of braking force energy that in FIG. 1 is supplied in the form of pressurised hydraulic fluid acting on a piston forming part of each brake 10, 11.

Other forms of brake are possible within the scope of the invention but in the FIG. 1 embodiment the brakes 10, 11 operate under the control of respective driven member brake commands generated in a controller 12 that in the preferred embodiment shown takes the form of an electronic control unit (ECU) that feeds the driven member brake commands via communication lines 13, 14, 16, 17 to an electrohydraulic converter module (EHM) 18 described in more detail below.

The EHM 13 is via hydraulic line 19 supplied with pressurised hydraulic fluid from a source such as but not limited to a pump that is not shown in the drawings. The EHM supplies pressurised fluid to the brakes 10, 11 in dependence on the driven member brake commands so as to apply a respective braking effort in each of the brakes 10, 11. In other words, the EHM 13 is capable of generating differential braking efforts in the respective brakes 10, 11 so as to give rise to a brake-steer function in accordance with a control regime as disclosed herein.

The preferred embodiment of the vehicle of the invention includes, as stated, steerable front wheels. These are omitted from FIG. 1 for clarity. The Ackermann (or other, as appropriate) steering assembly however includes in the arrangement shown left and right front brakes 21, 22 that may be of essentially conventional designs. The Ackermann assembly (or one or more components, such as a steering column or steering wheel operatively connected to it) includes a preferably electronic sensor that senses any angle (herein the "steering angle") to which the steerable wheels are turned during use of the tractor.

The output of the steering angle sensor is input to ECU 12 via control line 25.

A further input to ECU 12 is a signal indicative of the forward speed of the vehicle over the ground.

There are various ways of creating a vehicle ground speed input signal. For example it is known to provide in a tractor a radar or optical sensor that measures the speed of travel over the ground.

Another method involves calculating the speed based on data generated in a global positioning system (GPS) module that is operatively connected in the vehicle. Yet a further possibility is to include operatively connected to each the front wheels of the vehicle a wheel speed sensor. Such sensors are represented by numerals 23 (left front wheel speed sensor) and 24 (right front wheel speed sensor) in FIG. 1. The precise designs of the sensors may vary depending on the exact requirements of the designer of a vehicle according to the invention.

In a two-wheel drive vehicle the front wheels will virtually always rotate without slipping, so the average of the signal values generated by the wheel speed sensors 23, 24 will be an acceptably accurate estimation of the forward speed of the vehicle.

The outputs of the sensors 23, 24 are input to the ECU 12 via lines 26, 27 in the FIG. 1 embodiment of the invention.

Figure 3:
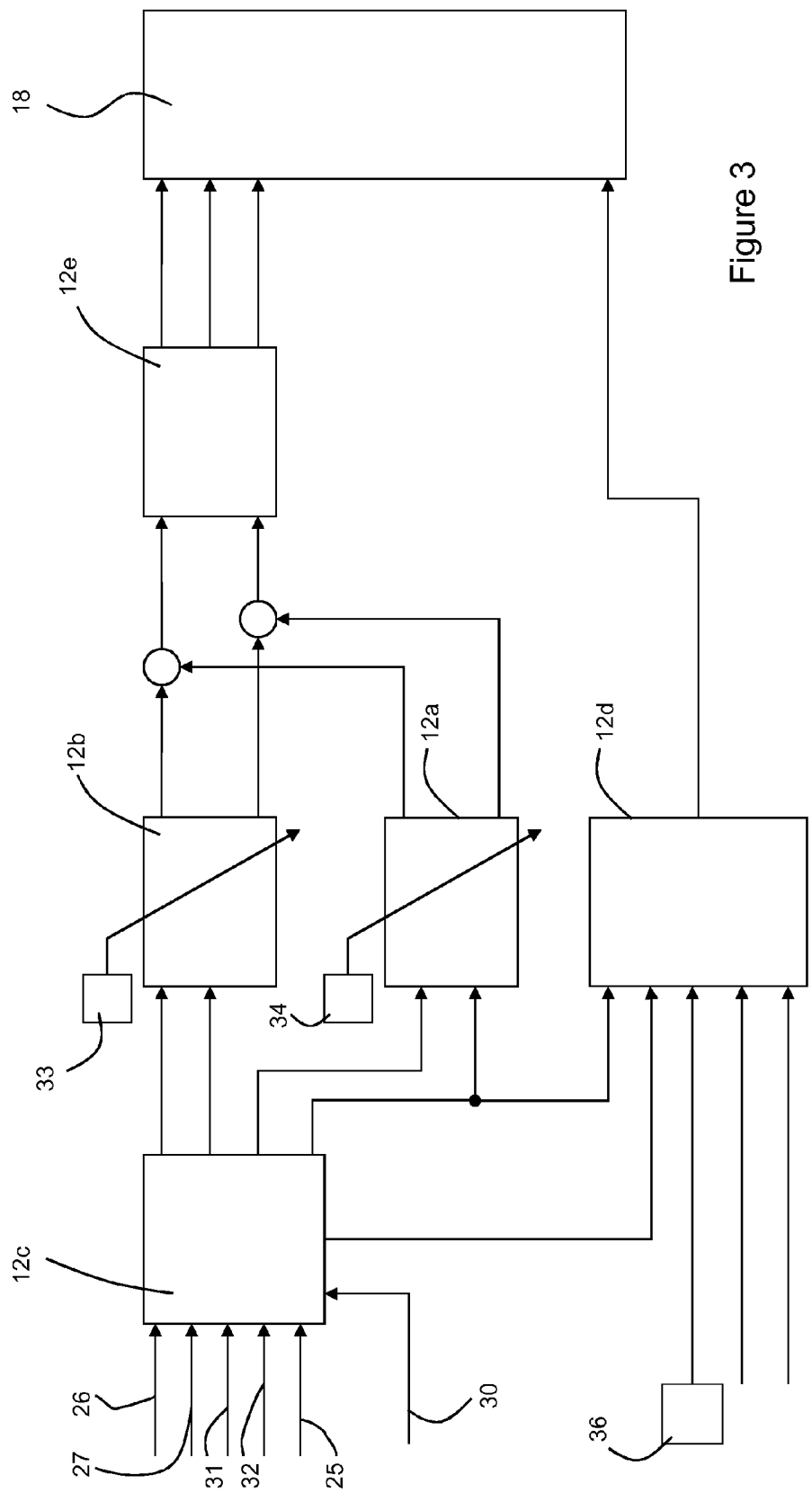
FIG. 3 shows in block diagram format the control architecture applicable in an arrangement such as that shown in FIGS. 1 and 2.

FIG. 1 omits any control line representing the inputting of GPS or radar/optical sensor vehicle speed data, but such an optional line is represented In FIG. 3, which shows the architecture of the ECU 12, by line 30. As implied by FIG. 3, it is possible for more than one of the possible apparatuses for estimating vehicle ground speed to be present in one and the same vehicle; but as implied by FIG. 1 it is also possible for only one of the apparatuses of this kind to be present.

FIG. 1 additionally shows the presence of two further wheel speed sensors 28, 29 that are respectively for detecting the speed of rotation of each of the rear wheels of the vehicle. In FIG. 1 numeral 28 represents the left side rear wheel speed sensor, and numeral 29 the right side rear wheel speed sensor. The sensors 28, 29 may be of similar types to sensors 23, 24 or may be of other types.

The sensors 28, 29 generate signals that indicate the speeds of the rear wheels. Since as explained during a turning manoeuvre one of the wheels may be rotating more slowly than the other, and in any event the rear wheels may be rotating at mutually different speeds because of the effect of the differential axle of the vehicle, the values of the signals output by the sensors 28, 29 may not be similar to one another and also may, depending on the prevailing circumstances of use of the tractor, differ significantly from the values of the signals generated by the front wheel speed sensors 23, 24.

The outputs of the rear wheel speed sensors are input to the ECU 12 via control lines 31, 32.

The ECU generates the driven member brake commands based on the steering angle signal input via line 25, the front wheel speed sensor signals that are input via lines 26 and 27 and are averaged for the purpose of calculating the vehicle speed; and the rear wheel speed sensor signals that are input via lines 31 and 32.

The ECU 12 generates the driven member brake commands only when certain conditions apply, namely that the vehicle speed is below a chosen threshold and the steering angle signal value exceeds a chosen threshold.

The vehicle speed threshold is applied to ensure that the vehicle is, during a headland or other sharp turn, travelling sufficiently slowly that there is no danger of a roll-over accident occurring. Obviously the precise value of the vehicle speed threshold may vary depending on the precise design of the vehicle in question, and also on whether the vehicle is operating on a slope, the latter determination being possible if the vehicle includes an optional inclinometer the output signal of which is fed to the ECU 12.

The steering angle threshold is used in essence to determine whether a turn required by the vehicle operator is sufficiently sharp as to justify operation of the apparatus described herein.

The ECU operates on the basis of an algorithm that determines from the front and rear wheel speed sensor signals and the steering angle signal the degree of slip of the driven wheels of the vehicle. The aim of the algorithm is to maintain the degree of slip at no more than a chosen level.

Slip may be expressed as a ratio or percentage, and as examples one may consider slip values in the range of say 10%-50% as potentially acceptable for providing sharp turns without causing headland or other ground damage.

The optimal degree of slip to be permitted during a sharp turn may vary depending on the nature of the ground on which the vehicle operates. For example if the vehicle is operating on waterlogged soil damage to the headland may occur very easily. In such a case the maximum level of slip that would be acceptable in order to avoid damage would be at a relatively low level of, for the sake of example, 10% or 20%. On the other hand if a vehicle according to the invention operates on very hard soil that has not been watered for several weeks a higher slip percentage may be acceptable.

FIG. 1 illustrates a slip adjustment member in the form of a potentiometer knob 33 that may be used by the operator of the vehicle to adjust the degree of slip for reasons such as those indicated above. The slip setting determined by the potentiometer knob 33 is input to ECU 12 as a parameter in the control algorithm.

In an alternative arrangement the operator-adjustable member 33 for adjusting the degree of slip may be replaced by an algorithm that sets a desired level of slip in software in an automatic manner.

Potentiometer 33 may of course be replaced or augmented by other slip adjustment members such as but not limited to slider potentiometers, touch-screen icons, buttons, biometric input devices or voice-activated command generators.

In a similar manner to which the chosen threshold degree of slip is adjustable the threshold steering angle value is in the FIG. 1 embodiment adjustable by reason of the inclusion of a steering angle gain adjustment member. In FIG. 1 this is illustrated as a further potentiometer 34, although the variations indicated above in relation to potentiometer 33 are also possible in relation to potentiometer 34. As in the case of potentiometer 33 the output of potentiometer (or other adjustment member) 34 is fed to ECU 12 for inclusion as a parameter in the control algorithm.

The steering angle gain adjustment function may also be implemented automatically in accordance with an algorithm, as an alternative to inclusion of an operator-adjusted member.

FIG. 1 additionally illustrates a further, optional control member in the form of an automatic braking mode selection switch 36 through use of which an operator may determine whether the control algorithm is available automatically to control the braking of the vehicle when the chosen vehicle speed and steering angle criteria are met. In the preferred form of the invention illustrated following selection of an automatic brake-steer mode the ECU 12 generates the driven member brake commands automatically once the criteria arise, and ceases to do so if either criterion is no longer met.

As a result of this control feature of the vehicle of the invention the need for dual brake pedals operating respectively on the left and right rear wheels in an agricultural tractor is obviated. A vehicle according to the invention is capable of braking-steering automatically, without any need for brake pedal control by the operator, simply by reason of the operator turning the steering wheel sufficiently far when the vehicle is moving at less than the threshold speed when the automatic braking mode selection switch is activated.

The potentiometer 34 and switch 36 may as desired be augmented or replaced by sliders, touch-screen icons, buttons, voice-activated commands or biometric input devices.

The vehicle however includes a conventional brake pedal 37 that provides braking of the vehicle under operator control at other times.

Brake pedal 37 is connected to an hydraulic tandem master cylinder 38 that on depression of the pedal 37 generates hydraulic pressure in respective left (39) and right (41) brake lines.

The tandem master cylinder 38 is such as to generate the same pressures in the two lines 39, 41 on depression of the pedal 37, the presence of distinct left and right brake lines being desirable primarily for per se known reasons of brake safety in the event of hydraulic line failure.

The hydraulic lines 39, 41 supply fluid under pressure to EHM 18 that in a manner described below generates braking forces in the four brakes 10, 11, 21, 22 when there is no need for brake-steering.

Since the tandem master cylinder 38 generates the same hydraulic force in each of lines 39 and 41 the braking effort is at such times balanced as between the left and right sides of the vehicle.

The brake pedal 37 is connected to left and right brake switches 42, 43 that via control lines 44, 46 provide signals indicating actuation of the pedal 37 to the ECU 12. The ECU 12 in turn generates commands that are fed to the EHM 18 for the purpose of routing the pressurised fluid in hydraulic lines 39, 41 to the vehicle brakes 10, 11, 21, 22.

The vehicle 10 of FIG. 1 includes a further, optional subassembly in the form of logic valve 47. This operates to disconnect the front brakes 21, 22 from the hydraulic fluid supply when a brake-steering operation takes place, so that the front wheels of the tractor are not slowed by the braking effort and the vehicle may more readily slew about a point approximately coinciding with the rear axle.

Logic valve 47 additionally may control the hydraulic pressure available for use in braking a trailer towed by the vehicle. To this end the logic valve 47 may be couplable to a hydraulic trailer brake valve 48 that is supported on the vehicle or a trailer for the purpose of controlling the trailer braking effort. Since the trailer valve 48 is fed from the logic valve 47 the trailer brakes are connected to the hydraulic supply while the front brakes also are so connected by virtue of the logic valve 47.

FIG. 1 furthermore illustrates respective pressure sensors 49, 51 that via control lines 52, 53 send to the ECU 12 signals indicating the input and output hydraulic pressures at the EHM 18. Such signals are used to ensure that the hydraulic pressures in the braking circuits do not fall outside accepted safe ranges.

Figure 2:
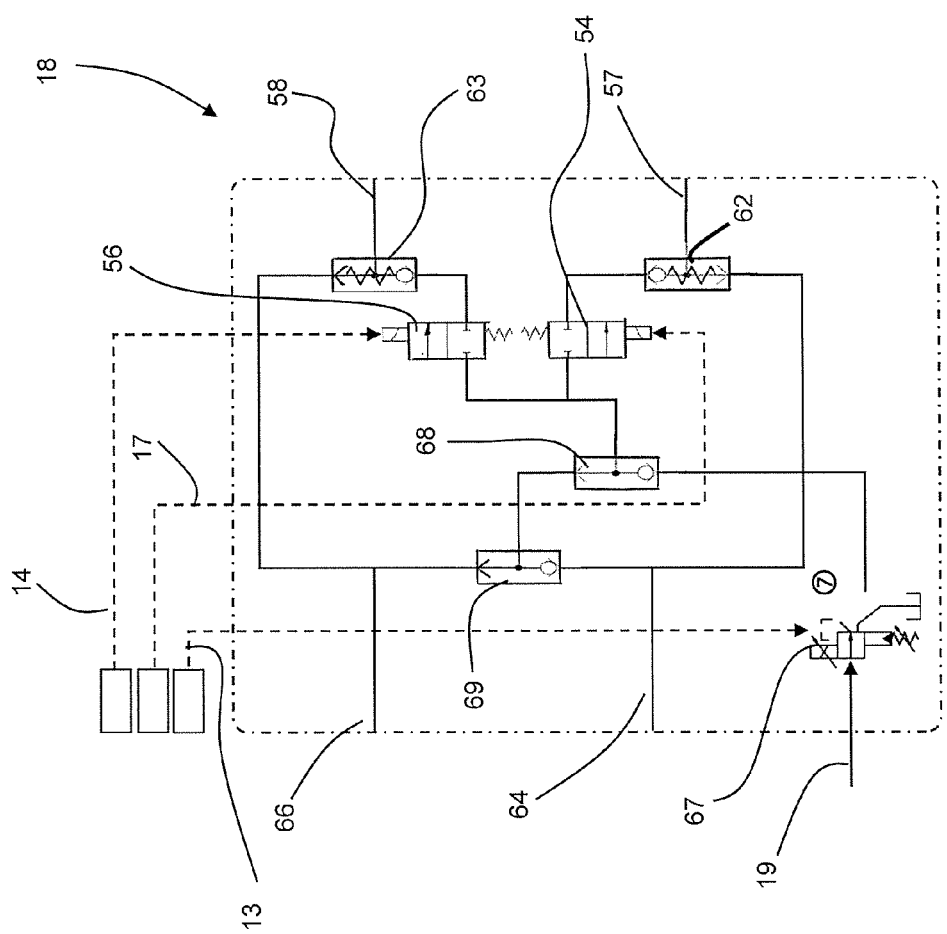
FIG. 2 shows in schematic form in greater detail an electrohydraulic converter module forming part of the FIG. 1 apparatus.

FIG. 2 shows in more detail one form of the EHM 18 visible in outline in FIG. 1.

The EHM 18 illustrated includes a pair 54, 56 of respective left and right solenoid valves that determine the braking effort applied to the left and right brakes of the vehicle whether operating in a brake-steer mode.

The output of each solenoid valve 54, 56 is fed to a respective left or right brake port 57, 58 connected to hydraulic lines 59, 61 for supplying pressurised hydraulic fluid to the brakes on the left and right sides of the vehicle, via the logic valve 47 in the case of the front brakes 21, 22.

The solenoid valve outputs pass to the brake ports 57, 58 via respective one-way check valves 62, 63 to which are parallel connected as inputs via tandem master cylinder ports 64, 66 the hydraulic lines 39, 41 visible in FIG. 1.

EHM 18 furthermore includes a pressure control valve 67 that controls the application of pressurised fluid in hydraulic line 19 for the generation of braking effort.

Pressure control valve 67 is a variable gain solenoid valve that is normally vented as illustrated in FIG. 2. Valve 67 is operated under the control of a command signal transmitted from ECU 12 via line 13 to connect pressurised hydraulic fluid for the purpose of providing a brake-steer function when the vehicle speed and steering angle threshold criteria are met. At other times pressure in line is circulated to the hydraulic reservoir of the vehicle.

When connected to provide brake-steering fluid pressure the output of pressure control valve 67 is fed via a double check valve to supply the solenoid valves 54, 56.

Driven member brake commands transmitted via lines 14 and 17 are fed respectively to the solenoid valves 54, 56 to provide differential brake forces in the left and right hydraulic lines 59, 61 via ports 57, 58 in proportion to the amount of braking effort required to effect the desired brake-steer turn.

When brake-steering is not required or possible for reasons explained herein pressure control valve 67 as indicated is disconnected from the solenoid valves 54, 56. If at such a time the brake pedal 37 is depressed the same pressure develops in the hydraulic fluid at each of the tandem master cylinder ports 64, 66 from where it is applied via the check valves 62, 63 to the hydraulic lines 59, 61 so that the brakes of the vehicle operate in a conventional manner.

The EHM includes a further double check valve 69 that interconnects the left and right tandem master cylinder ports 64 and 66 for the purpose of pressure balancing. Over-pressure from the check valve 68 also is vented via this valve as necessary.

The arrangement of FIGS. 1 to 3 is shown omitting ABS components, so the wheel speed sensors 26, 27, 31 and 32 are provided as discrete components. When however the vehicle includes antilock brakes the wheels would include ABS wheel speed sensors as a matter of course. Such sensors would in the great majority of instances be suitable for providing the wheel speed signals described above, such that there would be no need for further wheel speed sensors.

Figure 4:
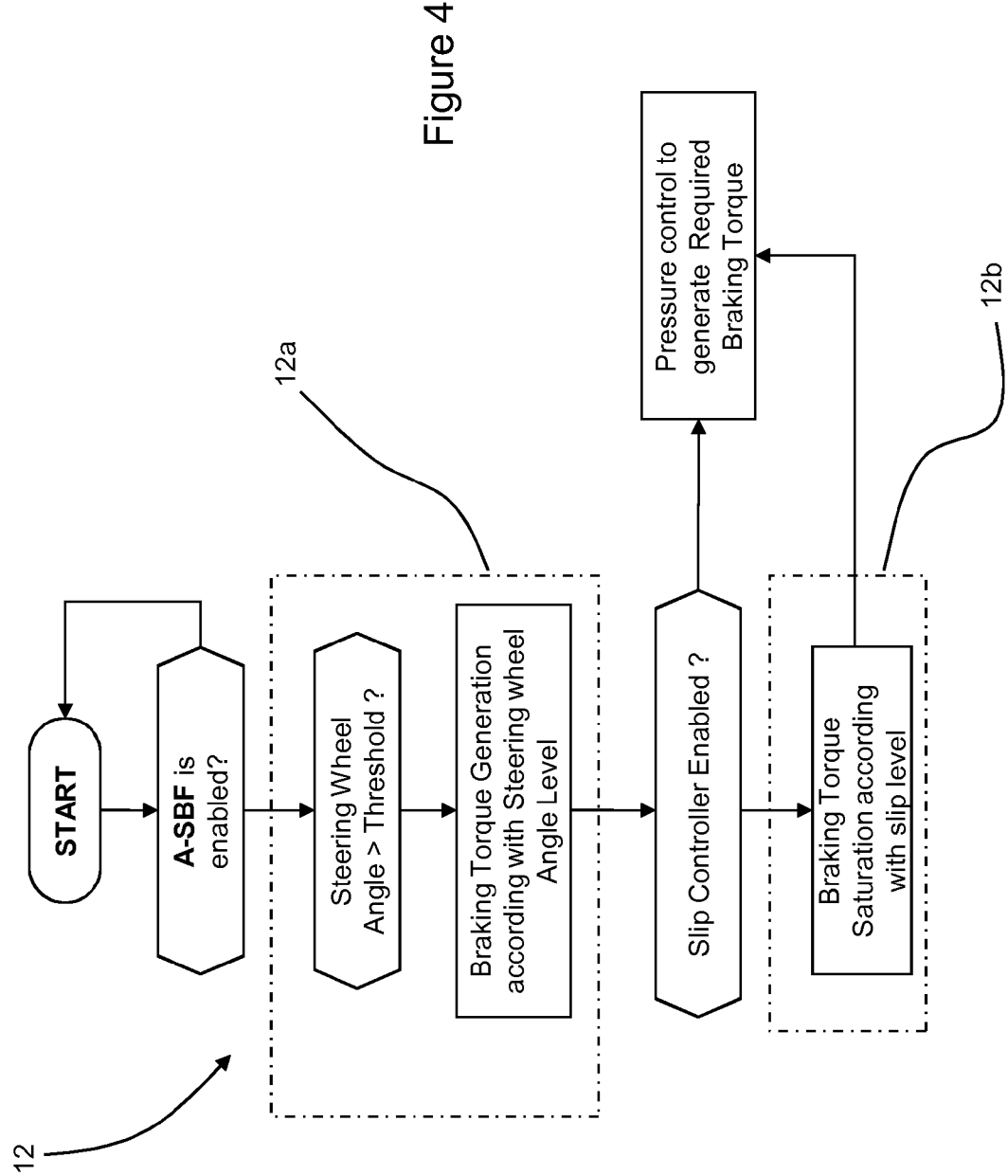
FIG. 4 is a flow chart summarising operation of the apparatus of FIGS. 1 and 2.

FIG. 4 is a flow chart showing the basic steps in a process of operating the components of FIGS. 1 to 3. FIG. 4 is essentially self-explanatory and in addition signifies that the ECU 12 may be regarded as performing two main functions as indicated by boxes 12a and 12b.

In box 12a the functions of the ECU 12 essentially are those of generating the reference signals that are needed for the generation of the driven member brake commands; and in box 12b the generation of the driven member commands takes place based on control of the slip of the driven wheels to within the chosen threshold.

These functions are also apparent in FIG. 3, in which the control architecture of the FIG. 1 arrangement is shown. FIG. 3 additionally illustrates that in the ECU 12 further functions of an "observer" 12c and "safety supervisor" 12d are provided.

The main purpose of the observer 12c is to collate and condition the various data inputs that are used in the ECU 12 and distribute them as needed to the reference generator 12a and the slip controller 12b.

The safety supervisor 12d receives data signals from the automatic braking mode selection switch 36, the various pressure measurement signals in the circuit and also an indication of the status of the observer 12c. If all of these data are within acceptable ranges the safety supervisor 12d sends to the EHM 18 an "enable" command that is transmitted via control line 16. If however any of the data that are input to the safety supervisor 12d are outside of acceptable ranges the safety supervisor 12d may switch off the enable command with the result that the EHM 18 is disabled and the brake-steer function is not available.

In the event of the brake-steer function not being available for this type of reason the safety supervisor 12d may be arranged to display an error message via a display device such as but not limited to a display screen located in the vehicle operator's cab.

The vehicle speed signal is calculated in the observer from the wheel speed sensor values and fed forward to the reference generator for use in generation of pressure commands discussed further below. The vehicle speed signals also are fed forwardly to the safety supervisor 12d, which cancels the enable command in the event of the vehicle speed exceeding the previously-discussed threshold level.

FIG. 3 furthermore shows that left and right braking pressure command signals are summed with left and right slip correction signals. The resulting, summed signals are individually processed in a portion of the ECU, referred to as "pressure control", in which the driven member brake commands that are transmitted to the EHM via lines 14 and 17 of FIG. 1, together with the pressure control valve command that is transmitted via control line 13, are generated.

In large vehicles it often is not suitable to include hydraulic circuits to provide braking functions. This is because the mineral oils used in hydraulic braking circuits have a relatively high volumetric absorption characteristic that in a complicated or extensive circuit (as may be needed in a large vehicle) causes an undesirable pressure modulation effect.

It is known in commercial vehicles generally to employ pneumatic braking systems. The invention includes a vehicle including a pneumatic braking circuit or a hybrid pneumatic-hydraulic circuit for the purpose of avoiding problems that may arise in hydraulic systems.

Figure 5:
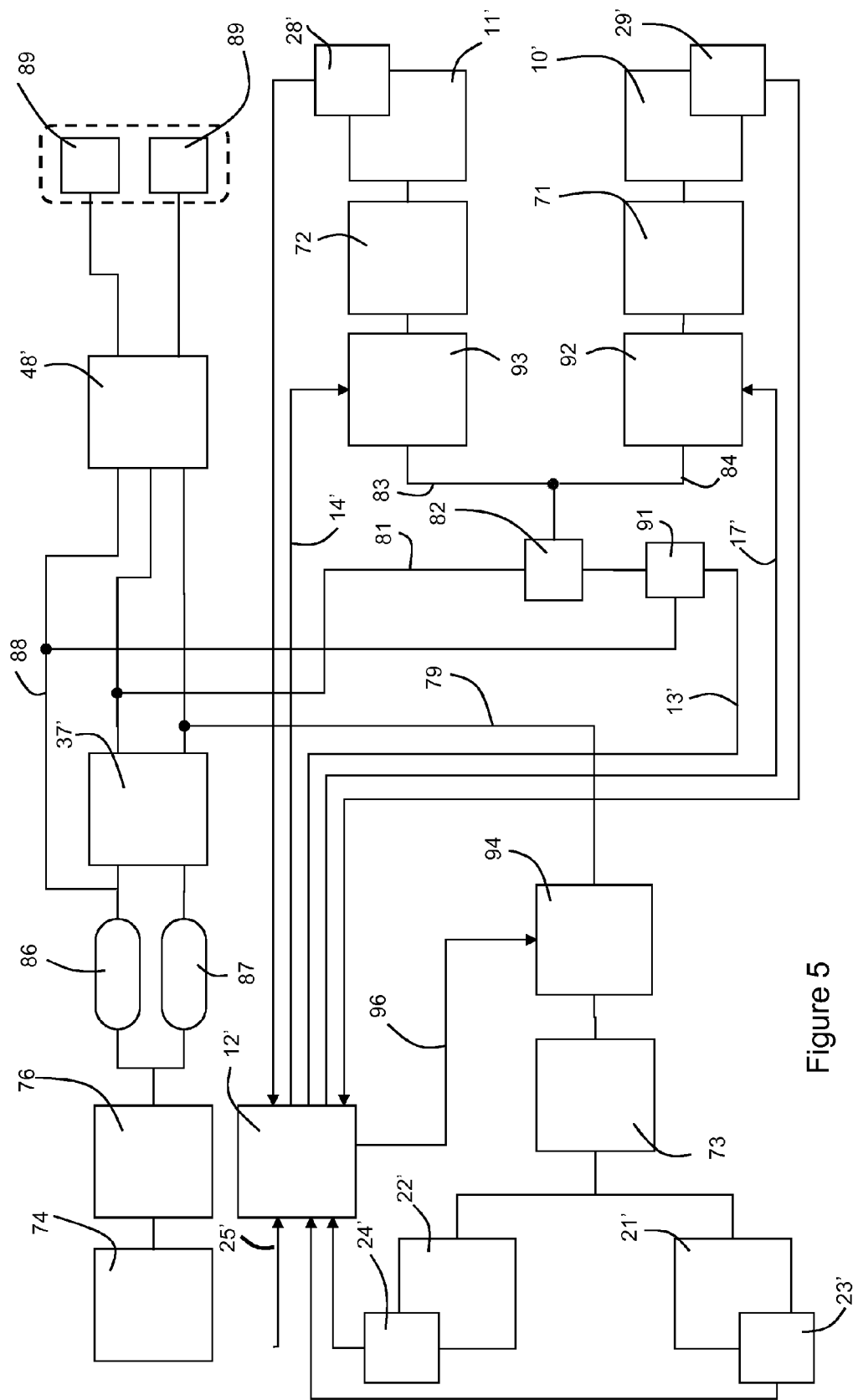
FIG. 5 shows in a similar manner to FIG. 1 certain components of a vehicle, according to the invention, that includes a predominantly pneumatic braking circuit.

An example of such a circuit forming part of a second embodiment of vehicle in accordance with the invention is shown in FIG. 5.

The design and functioning of the FIG. 5 circuit are similar to those of the FIG. 1 arrangement. Several components in FIG. 5 are counterparts of corresponding parts of FIG. 1, and are identified in FIG. 5 by primed counterparts of the FIG. 1 reference numbers.

Thus in FIG. 5 the left and right rear and front brakes 10', 11' 21' 22', the ECU 12', the wheel speed sensors 23', 24', 28', 29' and the brake pedal 37' may of similar construction to and provide the same functions as the counterpart components in FIG. 1 and will not be described further herein.

The brakes 10', 11', 21', 22' of FIG. 5 are in the embodiment shown hydraulically actuated brakes. In order to provide them with pressurised hydraulic fluid the pneumatic circuit of FIG. 5 includes for each of the rear brakes a respective pneumatic-hydraulic converter 71, 72 of per se known design.

A similar converter 73 is connected to provide hydraulic fluid under pressure to both the front brakes 21' 22' simultaneously.

The circuit of FIG. 5 therefore is a hybrid pneumatic-hydraulic circuit. In other embodiments of the invention the circuit may be entirely pneumatically driven, or may include electropneumatic or electric brake actuators.

Pneumatic gas (typically air) is provided to the FIG. 5 circuit by a compressor 74 driven directly or indirectly from the crank of the vehicle engine, or powered by an electric motor. The compressor 74 feeds compressed air via one or more in-line filters 76 to a pair of parallel-connected reservoirs 86, 87 that in turn are in effect valved by the brake pedal 37.

When pedal 37 is operated compressed air is bled in proportion to the extent of depression of pedal 37 to respective front (79) and rear (81) pneumatic lines.

Front pneumatic line provides the same braking effort to each of the front brakes 21', 22' and therefore a single line is employed to power the front converter 73.

Pneumatic line 81 on the other hand splits at a double check valve 82 to supply a respective pneumatic feed 83, 84 to each of the rear brakes 10', 11'.

Pressurised air is bled from one 86 of the reservoirs via further pneumatic line 88 firstly to supply compressed air to a trailer brake valve 48' the function of which is similar to trailer valve 48 of FIG. 1. Valve 48' is illustrated as being connected to a plurality of coupling heads. The nature of the circuit is such that if brake pedal 37' is operated while the brakes of a trailer are connected via the coupling heads the pneumatic pressure that acts to operate the brakes 10', 11' 21' 22' of the vehicle is also provided for operating the brakes of the trailer.

Compressed air in line 88 is also fed to a brake-steer valve 91 that operates in dependence on driven member brake commands generated in ECU 12 as signified by control line 13'.

In the FIG. 5 arrangement several of the functions of the EHM are provided by the brake-steer valve 91, that controls whether compressed air is admitted to the rear brakes for the purpose of achieving a tight turn without causing locking of either rear wheel of the vehicle. The ECU uses the same criteria for determining whether normally closed brake-steer valve should open, as ECU 12 of FIG. 1.

The further functions of the EHM 18 are provided by respective left and right rear ABS modules 92, 93 connected in the pneumatic lines 84, 83 respectively. The ABS modules are able, apart from their normal function of preventing locking of either rear wheel during emergency braking, to provide controlled prevention of locking of the rear wheel that is braked during a brake-steering manoeuvre in order to prevent field damage.

To this end the control lines 14', 17' corresponding to lines 14, 17 of FIG. 1 are connected directly to the rear ABS modules so as to provide the driven member brake commands respectively to those modules.

Since when the vehicle of the invention is configured as a tractor or similar wheeled vehicle there is no need to provide a differential braking effort as between the front, steerable wheels the circuit of FIG. 5 include a single ABS module 94 that is common to the front brakes 21', 22'. A single control line 96 transmits control commands from the ECU 12 to the ABS module 94.

Other arrangements of pneumatic circuit are possible within the scope of the invention. As an example, more or fewer braked axles than those indicated may be present in the vehicle of the invention, and the complexity of the circuit may be adjusted accordingly. Similarly, more or fewer ABS modules may be provided as desired.

Figure 6:
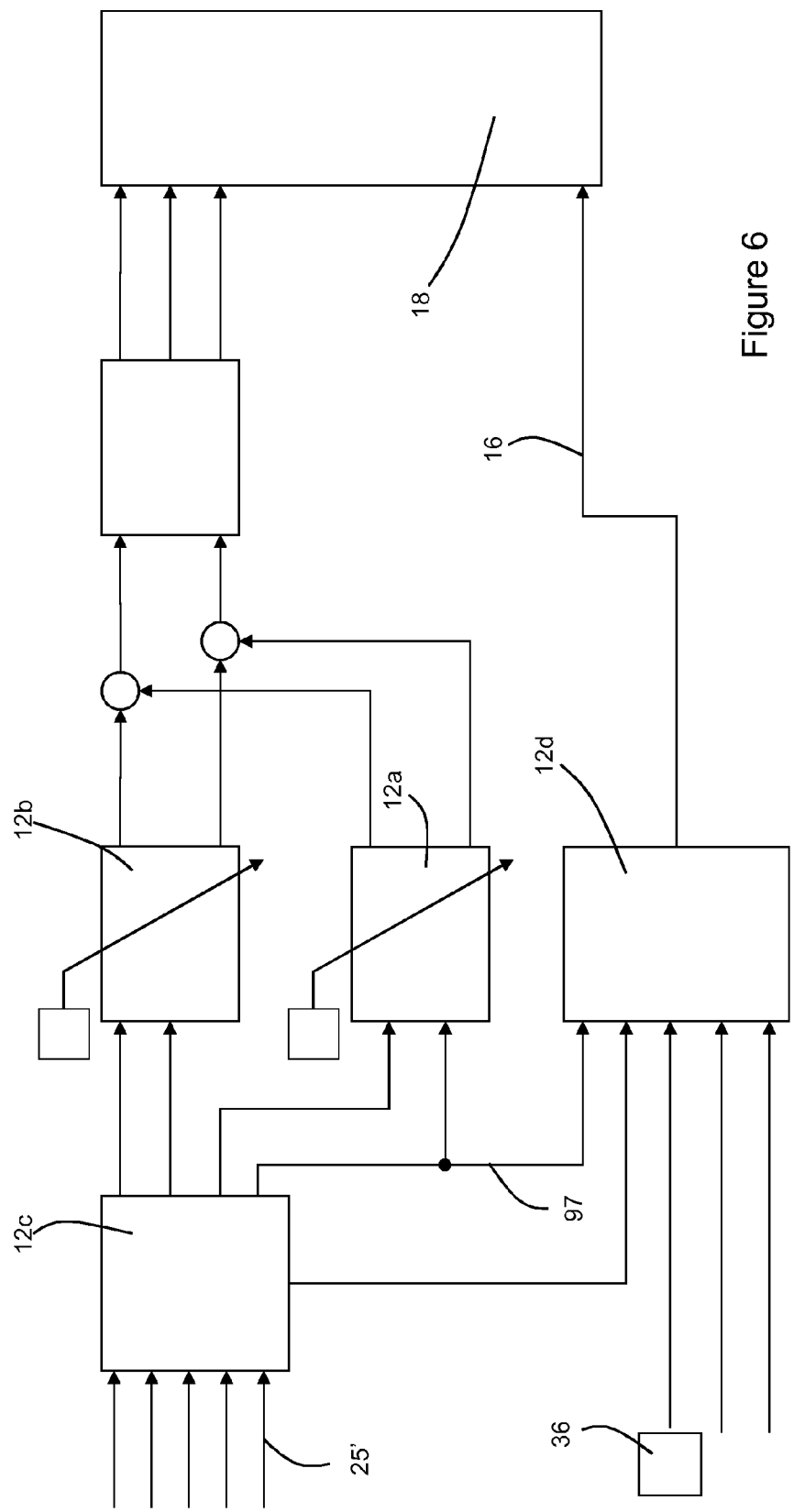
FIG. 6 shows the statuses of the control elements visible in FIG. 3 during an initial phase of operation of the apparatus shown in FIGS. 1 and 2.

FIGS. 6, 7 and 8 show the FIG. 3 control architecture in three different operational states corresponding respectively to initialising of the circuit ready for brake-steering operations; the application of the chosen brake force; and modulation of the brake force during braking steering in order to maintain a desired degree of slip.

In FIG. 6 the automatic braking mode selection switch 36 is depressed to initiate the brake-steering mode of operation of the circuit of FIG. 1.

This causes the safety supervisor part 12d of the ECU 12 to assess whether the vehicle speed signal value (signified by line 97) is less than the threshold value indicating whether it is safe to perform a brake-steer turn. If the safety supervisor determines that the vehicle speed is low enough for such a turn to be safe it sends an "enable" command via line 16 to EHM 18. The EHM is then prepared for operation.

In the next stage of the braking operation, as shown in FIG. 7, the vehicle speed signal transmitted via line 97 and the steering angle signal transmitted via line 98 are input to the reference generator part 12a of the ECU. The reference generator 12a then generates driven member brake commands in the form of left and right pressure commands transmitted via lines 99 and 101.

In the example illustrated the signal conveyed in line 99 is represented by a solid line, signifying that a positive brake force is required in the left rear brake in order to make the turn. A reduced or zero brake force required in the right rear brake is signified by the use of a dotted line as line 101. Of course in other instances of the use of the vehicle such a pattern of brake force commands need not necessarily be replicated.

Regardless of the precise pattern of brake force commands the pressure control section 12e of the ECU 12 from the commands generates required pressure control valve, left solenoid valve and right solenoid valve commands transmitted by lines 13, 14 and 17 respectively to the EHM 18.

The various valve commands result in a brake-steer effect.

The slip estimation calculated in the slip controller 12b is combined with the pressure commands transmitted in lines 99 and 101. If the degree of slip exceeds the chosen value (that may be pre-programmed into the ECU 12 or may be set using the slip adjustment member 33 if this is present) modulation of the braking force in the more heavily braked rear wheel occurs. This situation is illustrated in FIG. 8, in which appropriate left and right slip correction commands 102, 103 are combined with the pressure commands of lines 99 and 101 before these are fed to the hydraulic control part 12e of ECU 12.

If at any stage during the operations depicted in FIGS. 6 to 8 the vehicle speed exceeds the predetermined threshold value the safety controller may disengage the brake-steer mode by setting the enable command in line 16 to zero. Similarly certain other conditions (such as the output of an inclinometer, if present, indicating operation on an unacceptably steep slope) may result in disabling of the automatic brake-steering functions of the vehicle.

Although in the embodiments shown the various parts 12a-12e of the ECU 12 are described as being parts of a single controller (that for convenience may be embodied as an ASIC or similar processing device), this need not necessarily be so. On the contrary, the various functions of the ECU may be performed by a plurality of discrete components that may if desired be spaced from one another in the vehicle of the invention. Furthermore although the operative connections between parts of the ECU 12 that communicate electronically with one another are illustrated as conducting communication lines this need not necessarily be so. When desired connections between parts of the ECU may employ any of a range of types of wireless connection, for example.

It is possible to envisage similar representations to those of FIGS. 6-8 in respect of the control architecture of other embodiments of the invention, including but not limited to that of FIG. 5.

Regardless of the precise circuit and controller arrangements, one preferred form of equation forming the core of the slip estimation algorithm is:

$$S = \frac{\omega \cdot R - V_s \times 100}{V_s}$$

wherein:
S is the slip estimation
ω is the driven member speed signal value obtained from a said driven member
R is the radius of the driven member and
$V_s$ is the value of the vehicle speed signal.

As indicated the vehicle of the invention may be a four-wheel drive vehicle in which the front, steerable wheels are driven when the vehicle proceeds without enablement of the automatic brake-steer functions described herein. When so configured the vehicle may include a drive disengager (such as a mechanical, pneumatic, hydraulic or electric clutch) for disengaging drive to the front, driven wheels.

The ECU 12 of FIGS. 1 to 3 or the ECU 12' of FIGS. 5 to 8 may include, be connected to or may be configured as an "antoguidance" device. Such a device provides automated control of the vehicle speed, steering angle and/or braking functions at predetermined times.

An example arises when it is necessary to turn the vehicle in a headland. If (as is frequently the case) the width of the headland is essentially constant from one side of the field to the other the vehicle may be programmed to execute the same kind of turning manoeuvre each time the vehicle reaches the headland at the termination of a pass along the field. At such a time the ECU may assume control of the steering angle, engine governor and braking functions so that the turns are executed consistently and with minimal driver involvement.

In such an arrangement the ECU may be arranged to record a sequence of steering angle, governor and braking settings during an initial setting-up headland turn executed under driver control. Subsequent headland turns may then be completed under automated control.

Other ways of programming the ECU 12, 12' to perform automated manoeuvres are possible within the scope of the invention. One further example involves the use of distance sensors that may be used to map objects in the vicinity of the vehicle and move the vehicle so as to avoid contact with them. This form of autoguidance may be useful for example when it is necessary to park the vehicle in a shed or yard at the end of a day's work.

Overall the vehicle of the invention provides numerous advantages that were not predictable from the prior art, including most importantly an ability to make sharp headland turns without causing damage to the headland itself.

The listing or discussion of an apparently prior-published document in this specification should not necessarily be taken as an acknowledgement that the document is part of the state of the art or is common general knowledge.

The invention claimed is:

1. A vehicle including a frame, body, or chassis defining left and right sides and comprising:
   at least one source of motive power;
   at least one respective, driven, ground-engaging member supported on each side of the vehicle and configured to move relative to the vehicle during motion of the vehicle;
   at least one driven member drive train for connecting the source so as to cause movement of at least one of the driven, ground-engaging members and the vehicle;
   a respective brake for each driven, ground-engaging member, that controlled by driven member brake commands generated in a controller to provide a respective braking effort for each of the driven, ground-engaging members;
   at least one ground-engaging, steerable member that defines a steering angle, relative to the vehicle, that is configured to be adjusted via operation of one or more control members;
   at least one sensor configured to generate a steering angle signal that is indicative of the steering angle;
   at least one sensor configured to generate a vehicle speed signal that is indicative of the vehicle speed relative to the ground; and
   at least one sensor configured to generate a respective driven member speed signal that is indicative of a movement speed of each driven, ground-engaging member relative to the vehicle, wherein the controller is configured to:
   generate a driven member slip estimation based on the respective driven member speed signals; and
   generate the driven member brake commands based on the steering angle, the vehicle speed, and the driven member slip estimation, and wherein the driven member brake commands are generated only while the steering angle exceeds a predetermined steering angle threshold and while the vehicle speed is below a predetermined vehicle speed threshold.

2. The vehicle of claim 1, wherein the controller is programmable and generates the driven member brake commands to brake the driven members to enable no more than a predetermined maximum degree of slip of the driven members or to cause the drive member slip estimation to track a time-varying reference slip value.

3. The vehicle of claim 2, wherein the predetermined maximum degree of slip of the driven members is adjustable.

4. The vehicle of claim 3, including a slip adjustment member that is operatively connected to the controller and is configured to enable adjustment of the chosen maximum degree of slip by a driver of the vehicle.

5. The vehicle of claim 1, wherein the predetermined steering angle threshold is adjustable.

6. The vehicle of claim 5, including a steering angle gain adjustment member that is operatively connected to the controller to enable adjustment of the predetermined steering angle threshold by a driver of the vehicle.

7. The vehicle of claim 6, including operatively connected to the controller an automatic braking mode selection switch that is configured to enable a driver of the vehicle to selectively activate and deactivate the controller to generate the driven member brake commands.

8. The vehicle of claim 7, wherein the controller is configured to block generation of the driven member brake commands, regardless of the state of the braking mode selection switch, while the vehicle speed signal exceeds the predetermined threshold.

9. The vehicle of claim 8, including a pair of ground-engaging, steerable members in the form of a respective, steerable wheel located on each of the left and right sides of the vehicle.

10. The vehicle of claim 9, wherein each brake is a hydraulic brake, and the vehicle includes a driver-operated brake member operatively connected to an electrohydraulic converter that is operatively connected to the controller and is configured to be coupled to a source of pressurized hydraulic fluid, wherein the electrohydraulic converter is configured to convert operation of the driver-operated brake member into hydraulic pressure acting evenly in each respective brake so as to generate substantially equal braking efforts in the respective brakes on opposite sides of the vehicle, and wherein the electrohydraulic converter, upon receiving the driven member brake commands from the controller, causes a respective hydraulic pressure to act in each brake based on the steering angle, the vehicle speed, and the driven member slip estimation.

11. The vehicle of claim 10 wherein the electrohydraulic converter includes respective left- and right-side solenoid valves that are configured to be coupled to a source of hydraulic fluid under pressure, and wherein the solenoid valves are operatively connected to the controller and are configured to determine a hydraulic brake pressure in respective brakes on the left and right sides of the vehicle in response to the driven member brake commands.

12. The vehicle of claim 1, wherein each brake is a pneumatic brake or a pneumatic-hydraulic brake, and the vehicle includes a driver-operated brake member that is coupled to a source of pneumatic fluid under pressure, and wherein operation of the driver-operated brake member causes pneumatic pressure to act evenly in each respective brake so as to generate identical braking efforts in the respective brakes on opposite sides of the vehicle.

13. The vehicle of claim 12, including at least one pneumatic fluid distribution valve that is configured to be operatively coupled to the controller and is configured to be coupled to the source of pneumatic fluid under pressure to distribute the fluid to cause a respective pneumatic pressure to act in each respective brake based on the steering angle, the vehicle speed, and the driven member slip estimation.

14. The vehicle of claim 1, wherein each driven, ground engaging member is a driven wheel, and wherein the controller generates the driven member slip estimation based on the driven member speed signal value obtained from the driven wheel, the radius of the driven wheel, and the vehicle speed signal.

15. The vehicle of claim 1, including one or more antilock brake system (ABS) modules operative on at least one of the respective brakes.

16. The vehicle of claim 1, including an inclinometer that is configured to generate a signal indicative of at least the fore and aft inclination of the vehicle, wherein the controller is configured to apply the brakes uniformly on the left and right sides of the vehicle while the brake actuator is operated, while the inclination, the vehicle speed, and the steering angle are non-zero, and while the inclinometer signal value exceeds a predetermined threshold.

17. The vehicle of claim 1, wherein the controller includes, or is connected to, or is configured to receive commands or setpoints from an autoguidance device configured to control the vehicle speed, the steering angle, or the braking of the vehicle at one or more predetermined times.

18. A vehicle including a frame, body, or chassis defining left and right sides and comprising:

at least one source of motive power;

at least one respective, driven, ground-engaging, steerable member supported on each side of the vehicle and configured to move relative to the vehicle during motion of the vehicle and defining a steering angle relative to the vehicle that is adjustable via operation of one or more control members;

at least one driven member drive train connecting the source to the at least one respective, driven, ground-engaging, steerable member to cause movement of the at least one respective, driven, ground-engaging member and the vehicle;

a respective brake for each driven, ground-engaging member, wherein each respective brake is configured to provide a respective braking effort for each of the driven, ground-engaging members based on driven member brake commands generated by a controller;

a sensor configured to output a steering angle signal that is indicative of the steering angle of the vehicle;

a sensor configured to output a vehicle speed signal that is indicative of the vehicle speed relative to the ground; and wherein the controller is configured to receive the steering angle signal and the vehicle speed signal and to generate the driven member brake commands only while the steering angle exceeds a predetermined steering angle threshold and while the vehicle speed is below a predetermined vehicle speed threshold, and wherein the predetermined steering angle threshold is configured to be adjustable by the driver.

19. The vehicle of claim 18, comprising a sensor configured to output a respective driven member speed signal that is indicative of a speed of each driven, ground-engaging member relative to the vehicle, wherein the controller is configured to generate a driven member slip estimation based on the respective driven member speed signals, and wherein the driven member brake commands are based at least in part on the driven member slip estimation.

20. The vehicle of claim 18, wherein the controller is configured to generate the driven member brake commands in response to adjustment of the steering angle above the predetermined steering angle threshold while the vehicle speed is below the predetermined vehicle speed threshold without actuation of any driver-operated brake-member that is configured to enable an operator to control the respective brakes of the vehicle.

* * * * *